United States Patent
Ogita et al.

(10) Patent No.: US 7,504,063 B2
(45) Date of Patent: Mar. 17, 2009

(54) METHOD OF PRODUCING MOLDED GREEN BODY AND PRODUCING INSERT BY BAKING THE GREEN BODY

(75) Inventors: Kiyofumi Ogita, Shizuoka (JP); Ken Iida, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 504 days.

(21) Appl. No.: 10/885,081

(22) Filed: Jul. 7, 2004

(65) Prior Publication Data

US 2005/0006825 A1 Jan. 13, 2005

(30) Foreign Application Priority Data

Jul. 9, 2003 (JP) .............................. 2003-194084

(51) Int. Cl.
*B28B 21/18* (2006.01)

(52) U.S. Cl. ..................................... 264/667

(58) Field of Classification Search ................. 264/645, 264/667

See application file for complete search history.

(56) References Cited

U.S. PATENT DOCUMENTS

| | | | | | |
|---|---|---|---|---|---|
| 3,500,513 | A | * | 3/1970 | Stanley | 425/193 |
| 3,824,051 | A | * | 7/1974 | Van Leemput | 425/78 |
| 4,097,977 | A | * | 7/1978 | Pollner | 445/7 |
| 4,409,174 | A | * | 10/1983 | Toy et al. | 264/313 |
| 4,655,984 | A | * | 4/1987 | Hinton et al. | 264/314 |
| 5,137,663 | A | * | 8/1992 | Conaway | 264/36.15 |
| 5,269,988 | A | * | 12/1993 | Coetzer | 264/614 |
| 5,900,205 | A | * | 5/1999 | Sadr et al. | 264/531 |
| 6,372,165 | B1 | * | 4/2002 | Apte et al. | 264/112 |

FOREIGN PATENT DOCUMENTS

| | | |
|---|---|---|
| JP | 5-6326 Y2 | 2/1993 |
| JP | 11-320525 A | 11/1999 |
| JP | 11-322406 A | 11/1999 |
| JP | 11-322447 A | 11/1999 |
| JP | 2001-214535 A | 8/2001 |

* cited by examiner

*Primary Examiner*—Eric Hug
*Assistant Examiner*—Russell J Kemmerle, III
(74) *Attorney, Agent, or Firm*—Foley & Lardner LLP

(57) ABSTRACT

A method of producing an insert which is to be embedded in a concrete structure comprises preparing a flexible mold, setting a cylindrical core in the flexible mold, pouring a powdered ceramic material into the flexible mold in such a manner to fully cover the cylindrical core, compressing the flexible mold from the outside to compress the powdered ceramic material thereby to produce a molded green body that holds therein the cylindrical core, removing the molded green body together with the cylindrical core from the flexible mold, removing the cylindrical core from the molded green body proper by turning the cylindrical core in a releasing direction, and baking the molded green body proper to produce the insert. The cylindrical core has a male thread portion formed thereon and thus, upon removal of the cylindrical core from the molded green body proper, the molded green body has a female thread bore portion.

10 Claims, 10 Drawing Sheets

METHOD OF PRODUCING MOLDED GREEN BODY AND PRODUCING INSERT BY BAKING THE GREEN BODY

BACKGROUND OF THE INVENTION

1. Field of the Invention

The present invention relates in general to inserts that are to be embedded in concrete structures, and more particularly to the inserts made of ceramics. More specifically, the present invention relates to a method of producing a molded green body and producing an insert by baking the molded green body.

2. Description of the Related Art

Hitherto, various methods for producing inserts for concrete structures have been proposed and put into practical use. Some of them are of a type that, as is described in for example Laid-open Japanese Patent Applications (Tokkaihei) 11-322447, 11-322406, 11-320525 and Japanese Utility Model 5-6326, uses an isostatic pressing machine, such as a cold isostatic pressing machine (CIP) or the like. In this method, ceramics are used as the material of the inserts.

Japanese Utility model 5-6326 and Laid-open Japanese Patent Application (Tokkai) 2001-214535 disclose methods of producing inserts of a type that has a female thread bore portion (or internally threaded bore) formed therein. When the insert is practically embedded in a cured concrete structure, the female thread bore portion is used for receiving a connecting bolt to connect construction parts to the concrete structure.

SUMMARY OF THE INVENTION

However, even in the inserts produced by the method disclosed by the above-mentioned publications, namely, Japanese Utility model 5-6326 and Laid-open Japanese Patent Application (Tokkai) 2001-214535, the female thread bore portion formed in the insert fails to show an exact positioning relative to the body of the insert.

Accordingly, the present invention is aimed to provide a method for producing an insert having a female thread bore portion that has an exact positioning relative to the body of the insert.

In order to achieve the method of the present invention, the inventors have paid attention to the following three facts.

First, in order to provide an insert with a female thread bore portion, it is necessary to set a core in a mold. If the core is not correctly set in the mold, the female thread bore portion formed in the produced insert fails to make an exact alignment with an axis of the body of the produced insert. As is easily understood, in such case, it tends to occur that the female thread bore portion of the insert embedded in a cured concrete structure can not fully or sufficiently receive a connecting bolt. Of course, in this case, the construction parts can not be tightly connected to the cured concrete structure.

Second, in the isostatic pressing work, a plurality of flexible molds that form a male die are received and aligned in a flexible tube of a female die, and a certain hydrostatic pressure is applied to the flexible tube from the outside to evenly compress the flexible molds. With this compression of the flexible molds, a powdered ceramic material in each flexible mold is compressed to form a molded green body of an insert which is to be finally produced. However, if the flexible molds are not properly and tightly aligned in the flexible tube of the female die, the application of the hydrostatic pressure to the powdered ceramic material in each flexible mold is not evenly carried out. If the pressure application is not evenly made, the molded green body thus produced fails to have a sufficient strength. In this case, the molded green body tends to have cracks during the sintering or baking process.

Third, under the molding process, a lid of each flexible mold is kept in contact with the powdered ceramic material contained in the flexible mold. Thus, if, after completion of the molding, the lid is roughly removed from the molded green body produced, it tends to occur that the portion of the molded green body to which the lid has contacted is broken.

According to the present invention, there is provided a method of producing a molded green body by compressing a powdered ceramic material, the molded green body having a female thread bore portion that shows an exact positioning relative to the entire construction of the molded green body.

According to the present invention, there is provided a method of producing an insert by sintering or baking the molded green body, the insert thus produced having a female thread bore portion that shows an exact positioning relative to the entire construction of the insert.

In accordance with a first aspect of the present invention, there is provided a method of producing a molded green body of an insert which is used as an insert element embedded in a concrete structure and has recesses on its outer surface. The method comprises (a) preparing a flexible mold which includes a flexible hollow member and upper and lower lids which can close upper and lower open ends of the flexible hollow member to form in the flexible hollow member a molding cavity, the flexible hollow member having projections that are exposed to the molding cavity; (b) setting a cylindrical core to the lower lid while making an assured positioning of the cylindrical core relative to the lower lid by intimately putting a flat surface of the cylindrical core on a flat surface of the lower lid, and setting the lower lid to the lower open end of the flexible hollow member in such a manner that a major portion of the core is projected into the molding cavity, the major portion of the core being formed on its cylindrical outer surface with a male thread portion and having a closed top end; (c) pouring a powdered ceramic material into the molding cavity from the upper open end of the flexible hollow member to fill the molding cavity with the powdered ceramic material, and setting the upper lid to the upper open end of the flexible hollow member in such a manner that a space defined between the upper lid and the closed top end of the cylindrical core is filled with the powdered ceramic material; (d) compressing the flexible hollow member from the outside to compress the powdered ceramic material thereby to produce in the molding cavity a molded green body that holds therein the cylindrical core; (e) removing the molded green body together with the cylindrical core from the flexible mold once the molding of the molded green body is sufficiently carried out; and (f) turning the cylindrical core in a releasing direction relative to the molded green body thereby to remove the cylindrical core from the molded green body.

In accordance with a second aspect of the present invention, there is provided a method of producing an insert which is used as an insert element embedded in a concrete structure and has recesses on. its outer surface. The method comprises (a) preparing a flexible mold which includes a flexible hollow member and upper and lower lids which can close upper and lower open ends of the flexible hollow member to form in the flexible hollow member a molding cavity, the flexible hollow member having projections that are exposed to the molding cavity; (b) setting a cylindrical core to the lower lid while making an assured positioning of the cylindrical core relative to the lower lid by intimately putting a flat surface of the cylindrical core on a flat surface of the lower lid, and setting the lower lid to the lower open end of the flexible hollow member in such a manner that a major portion of the core is projected into the molding cavity, the major portion of the core being formed on its cylindrical outer surface with a male thread portion and having a closed top end; (c) pouring a powdered ceramic material into the molding cavity from the upper open end of the flexible hollow member to fill the molding cavity with the powdered ceramic material, and setting the upper lid to the upper open end of the flexible hollow member in such a manner that a space defined between the upper lid and the closed top end of the cylindrical core is filled with the powdered ceramic material; (d) compressing the flexible hollow member from the outside to compress the powdered ceramic material thereby to produce in the molding cavity a molded green body that holds therein the cylindrical core; (e) removing the molded green body together with the cylindrical core from the flexible mold once the molding of the molded green body is sufficiently carried out; (f) turning the cylindrical core in a releasing direction relative to the molded green body thereby to remove the cylindrical core from the molded green body; and (g) baking the molded green body to produce the insert.

In accordance with a third aspect of the present invention, there is provided a flexible mold for molding a shaped green body of an insert from a powdered ceramic material, which comprises a flexible hollow member having a cylindrical cavity and upper and lower open ends through which the cylindrical cavity is exposed to the outside of the hollow member; an upper lid detachably connected to the upper open end of the flexible hollow member to close the same; a lower lid detachably connected to the lower open end of the flexible hollow member to close the same, the lower lid having a circular projection which has a flat surface facing the cavity of the flexible hollow member, the circular projection having a cylindrical recess exposed to the cavity of the flexible hollow member; and a cylindrical core detachably connected to the lower lid, the cylindrical core including a cylindrical base that neatly received in the cylindrical recess of the circular projection of the lower lid, a male thread portion that is projected into the cavity of the flexible hollow member and an annular flange that has a flat surface intimately put on the flat surface of the circular projection of the lower lid, the annular flange having a periphery that is in contact with an inner surface of the cavity of the flexible hollow member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

First, a process for producing a powdered ceramic material for the insert will be described.

Aluminum oxide ($Al_2O_3$) is prepared as a main component. Then, as a sub-component, 3 to 6 wt. percent of magnesium oxide (MgO), calcium oxide (CaO) or silicon dioxide ($SiO_2$) is added to the aluminum oxide ($Al_2O_3$) to produce a mixture. Then, the mixture is fed with water and milled for about 10 hours by using a bowl mill. With these steps, a material slurry is produced. If desired, in place of aluminum oxide ($Al_2O_3$), zirconium oxide ($ZrO_2$) may be used as the main component.

Then, an organic binder, such as polyvinyl alcohol or the like and a dispersing agent, such as polycarboxylic acid ammonium salt or the like are added to the material slurry, and then this mixed slurry is dried at about 150° C. by means of a spray drier. With this drying, a powdered ceramic material "PCM-0" for the insert is produced.

The powdered ceramic material "PCM-0" thus produced is then subjected to a molding process to produce a molded green body "PCM-1" for the insert by means of cold isostatic pressing (CIP) under pressure of about 500 Kg/cm², as will be described hereinafter.

Figure 1:
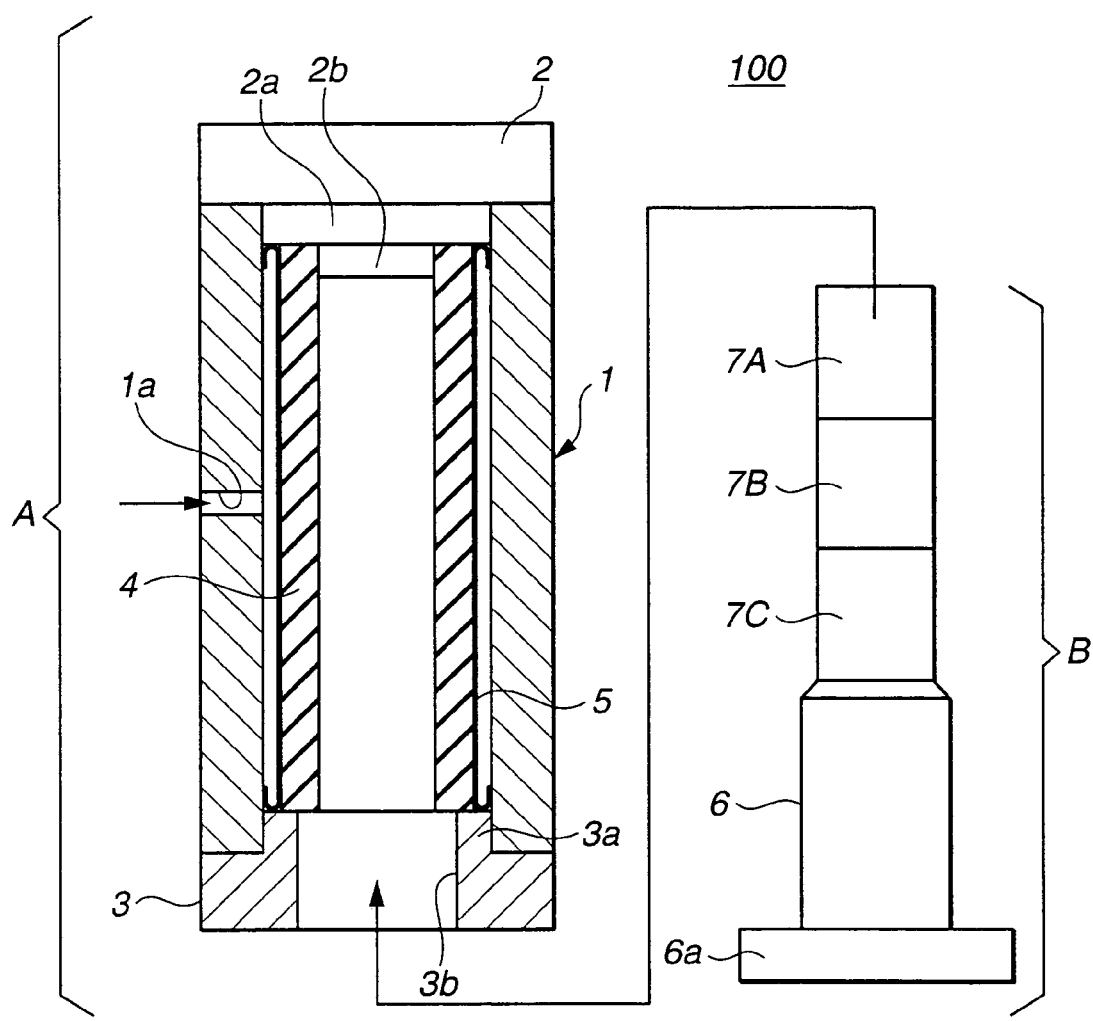
FIG. 1 is a schematically illustrated isostatic pressing machine that is used for carrying out the method of the present invention, the machine comprising female and male dies.

FIG. 1 shows schematically an isostatic pressing machine 100 that is used for carrying out the molding of the powdered ceramic material.

The isostatic pressing machine 100 generally comprises a female die "A" and a male die "B" which is insertable into the female die "A".

The female die "A" comprises a metal tube 1 that is a so-called pressure vessel and has a pressure inlet opening 1a formed through a cylindrical wall thereof.

A circular upper lid 2 of metal is detachably put on an upper open end of the metal tube 1 to close the upper opening. The circular upper lid 2 comprises a circular base (no numeral), a larger-diameter circular projection 2a coaxially provided on a lower part of the circular base, and a smaller-diameter circular projection 2b coaxially provided on a lower part of the larger-diameter circular projection 2a. As shown, the larger-diameter circular projection 2a has a diameter just matched with the upper opening of the metal tube 1.

As shown, a circular lower metal lid 3 is incorporated with a lower end of the metal tube 1 to support thereon the same. That is, the circular lower lid 3 comprises a circular base (no numeral) and a circular projection 3a coaxially provided on an upper part of the circular base. As shown, the circular projection 3a has a diameter just matched with a lower opening of the metal tube 1. The circular lower lid 3 has a concentric center bore 3b exposed to the interior of the metal tube 1, as shown.

Within the metal tube 1, there is movably received a flexible tube 4 of polyurethane through a tubular rubber seal 5. As shown, the tubular rubber seal 5 entirely covers the cylindrical wall of the flexible tube 4. The flexible tube 4 has an upper open end that is just mated with the smaller-diameter of circular projection 2b of the upper lid 2 and a lower open end that is put on the circular projection 3a of the lower lid 3.

As is seen from FIG. 1, the male die "B" comprises a cylindrical base 6 that has a circular flange 6a integrally formed on a lower end thereof, and three identical flexible molds 7A, 7B and 7C that are piled on one another and put on the cylindrical base 6.

Figure 2:
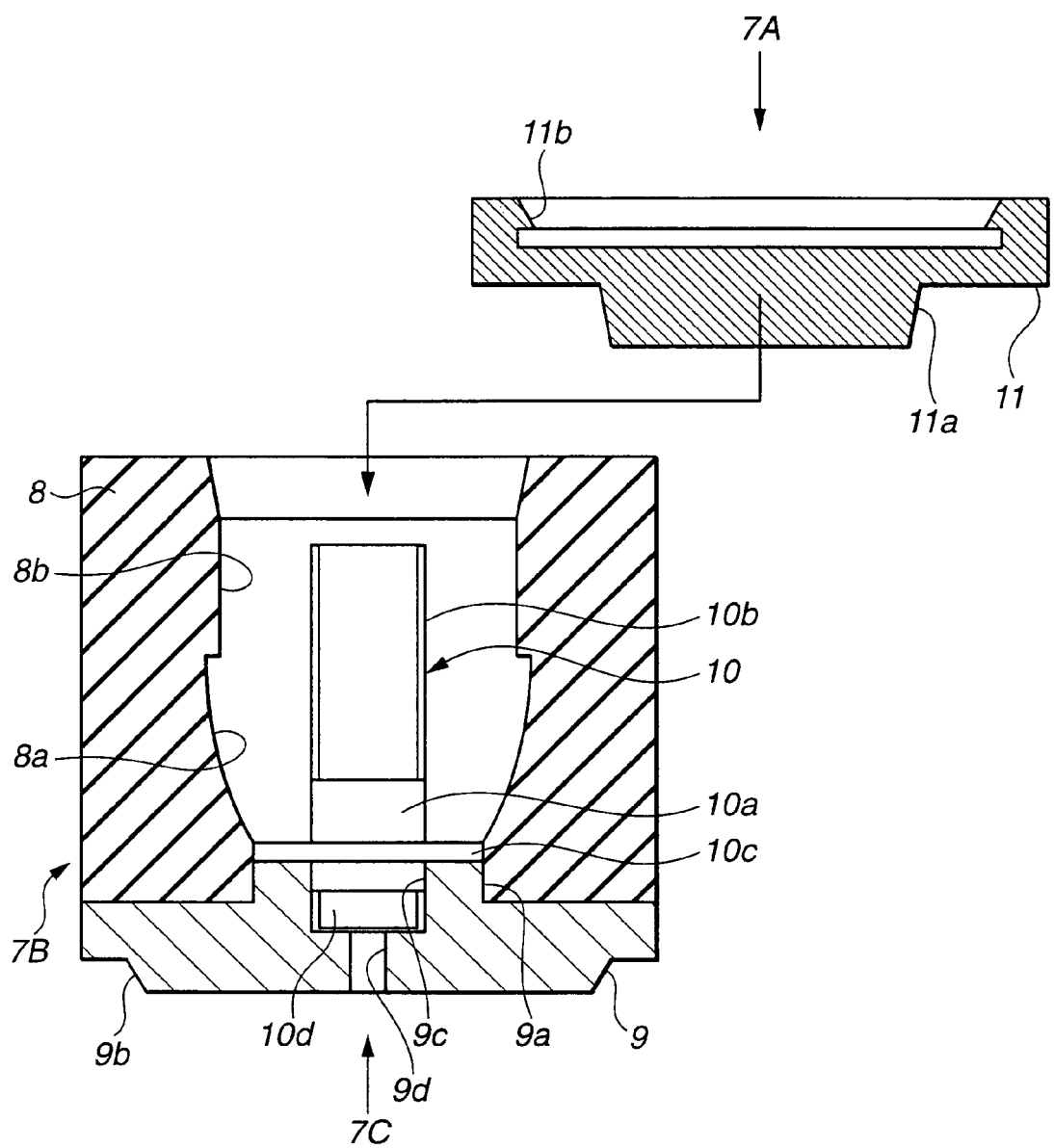
FIG. 2 is a sectional view of a flexible mold having a cylindrical core set therein, the flexible mold constituting part of the male die.

As is seen from FIG. 2, each of the identical flexible molds 7A, 7B and 7C, for example, the flexible mold 7B comprises a flexible cylindrical hollow member 8 made of rubber or the like. As shown, the cylindrical hollow member 8 has a generally cylindrical cavity 8a defined therein. In the illustrated embodiment, the cavity 8a is shaped like a bell. An inner surface of the hollow member 8, that defines the cylindrical cavity 8a, is formed with two diametrically opposed projections 8b. As will become apparent as the description proceeds, due to provision of such diametrically opposed two projections 8b, an insert that is finally produced can have at diametrically opposed portions of the outer surface thereof respective recesses that serve as a rotation stopper when the insert is practically embedded in a cured concrete structure.

A circular lower metal lid 9 is incorporated with a lower open end of the cylindrical rubber hollow member 8 to support thereon the hollow member 8 and close the lower open end, as shown. That is, the circular lower lid 9 comprises a circular base (no numeral), a smaller-diameter upper circular projection 9a coaxially provided on an upper part of the circular base, and a larger-diameter lower circular tapered projection 9b coaxially provided on a lower part of the circular base. As shown, the smaller-diameter upper circular projection 9a is just mated with the lower end of the cylindrical cavity 8a of the rubber hollow member 8.

The circular lower metal lid 9 is formed with a cylindrical recess 9c that extends through a center area of the smaller-diameter upper circular projection 9a to be exposed to the cylindrical cavity 8a of the rubber hollow member 8. The lower metal lid 9 has further a passage 9d that extends downward from the cylindrical recess 9c and terminates at a lower surface of the larger-diameter lower circular tapered projection 9b.

Received in the cylindrical recess 9c of the circular lower metal lid 9 is a lower part of a cylindrical core 10 which is projected into the cylindrical cavity 8a of the rubber hollow member 8, as shown. As will become understood hereinafter, the cylindrical core 10 is used for providing the produced insert with a female thread bore portion.

The cylindrical core 10 comprises a cylindrical base 10a that is received in the cylindrical recess 9c of the lower metal lid 9 and a male thread portion (or externally threaded cylindrical portion) 10b that is integral with and extends upward from the cylindrical base 10a. It is to be noted that the top of the cylindrical core 10 is closed. The cylindrical base 10a has a smaller-diameter lower end portion 10d to define an annular space (no numeral) between a cylindrical inner wall of the cylindrical recess 9c and a cylindrical outer wall of the cylindrical base 10, as shown.

The cylindrical core 10 further comprises an annular flange 10c that is disposed on the cylindrical base 10a. As shown, the annular flange 10c is oriented perpendicular to an axis of the cylindrical core 10.

As shown, the annular flange 10c is intimately put on an upper flat surface of the smaller-diameter upper circular projection 9a of the lower lid 9 and has an outer diameter substantially equal to that of the circular projection 9a. As shown, a periphery of the annular flange 10c is in contact with an inner surface of the rubber hollow member 8.

As will become apparent hereinafter, the outer diameter of the annular flange 10c is larger than an outer diameter of an open end portion of a molded green body of the insert.

A circular upper metal lid 11 is incorporated with an upper open end of the cylindrical rubber hollow member 8 to close the open end. That is, the circular upper lid 11 comprises a circular base (no numeral), a circular tapered projection 11a coaxially provided on a lower part of the circular base and a circular tapered recess 11b coaxially provided on a upper part of the circular base. The circular tapered projection 11a is just mated with an upper end of the cylindrical cavity 8a of the rubber hollow member 8.

It is to be noted that the circular tapered recess 11b receives therein the larger-diameter lower circular tapered projection 9b of the circular lower lid 9 of the upper-positioned flexible mold 7A.

It is further to be noted that upon proper setting the circular upper lid 11 on the rubber hollow member 8, the lower surface of the circular tapered projection 11a is kept away from a top of the cylindrical core 10.

In the following, a process of producing a molded green body of the insert by using the above-mentioned isostatic pressing machine 100 will be described in detail with reference to the accompanying drawings.

First, the three flexible molds 7A, 7B and 7C are properly set in such a manner as has been mentioned hereinbefore with reference to FIG. 2. That is, in each flexible mold 7A, 7B or 7C, a condition is established wherein the circular lower lid 9 is mated with the lower end portion of the rubber hollow member 8, the cylindrical core 10 is mated with the cylindrical recess 9c of the lower lid 9, the annular flange 10c of the core 10 is in contact with the upper surface of the smaller-diameter upper circular projection 9a of the lower lid 9, and the annular flange 10c of the core 10 is oriented perpendicular relative to the axis of the rubber hollow member 8 and to an axis of the lower lid 9.

Figure 3:
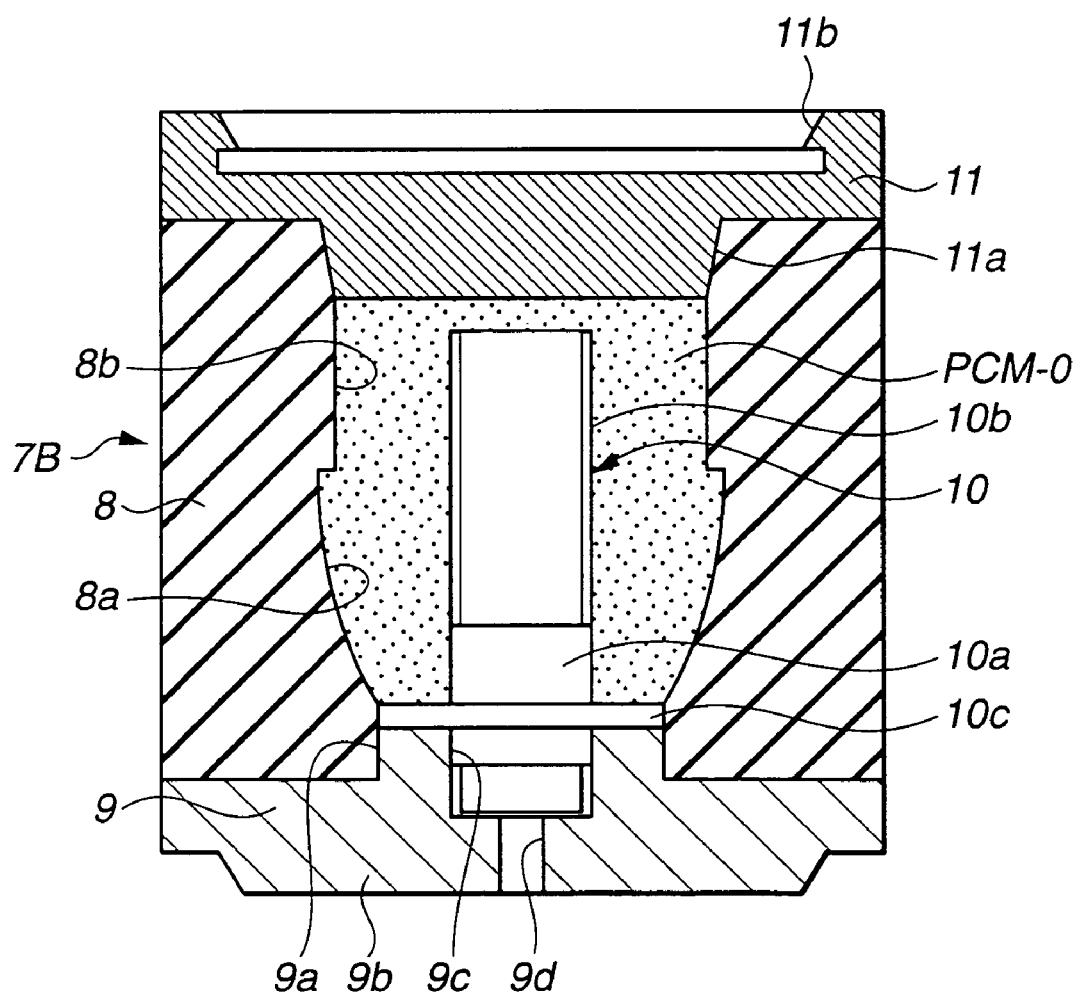
FIG. 3 is a sectional view of the flexible mold in a condition wherein the mold is filled with a powdered ceramic material.

Then, as is seen from FIG. 3, the cylindrical cavity 8a of each flexible mold 7A, 7B or 7C is filled with the above-mentioned powdered ceramic material "PCM-0" and then the circular upper metal lid 11 is put on the rubber hollow member 8.

Then, as is seen from FIG. 1, the three flexible molds 7A, 7B and 7C are put on one another and these piled molds 7A, 7B and 7C are set on the cylindrical base 6 to constitute the male die "B". Although not shown in the drawing, the cylindrical base 6 has at its top a recess that is identical to the above-mentioned circular tapered recess 11b of the circular upper lid 11 (see FIG. 2). Thus, the lower-positioned flexible mold 7C can be stably set on the cylindrical base 6.

Then, as is understood from FIG. 1, the male die "B" is inserted into the female die "A" through the center bore 3b of the circular lower lid 3 of the female die "A" and slid in the female die "A" until the circular flange 6a of the male die "B" is brought into contact with the circular lower lid 3 of the female die "A". Upon this, the aligned three flexible molds 7A, 7B and 7C are properly received in the flexible tube 4 of the female die "A".

Then, the circular upper and lower lids 2 and 3 of the female die "A" are pressed against the upper and lower ends of the metal tube 1 of the female die "A" by means of hydraulically actuated rods (not shown). With this, the female die "A" is fixed.

Then, a hydrostatic pressure of, for example, about 500 Kg/cm² is applied through the pressure inlet opening 11a to the metal tube 1, more specifically, to a cylindrical space defined between the metal tube 1 and the flexible tube 4. Upon this, the hydrostatic pressure is evenly applied to the flexible tube 4 and thus evenly compresses the flexible tube 4. With this compression, the three flexible molds 7A, 7B and 7C of the male die "B" are evenly pressed compressing the respective rubber hollow members 8.

Figure 4:
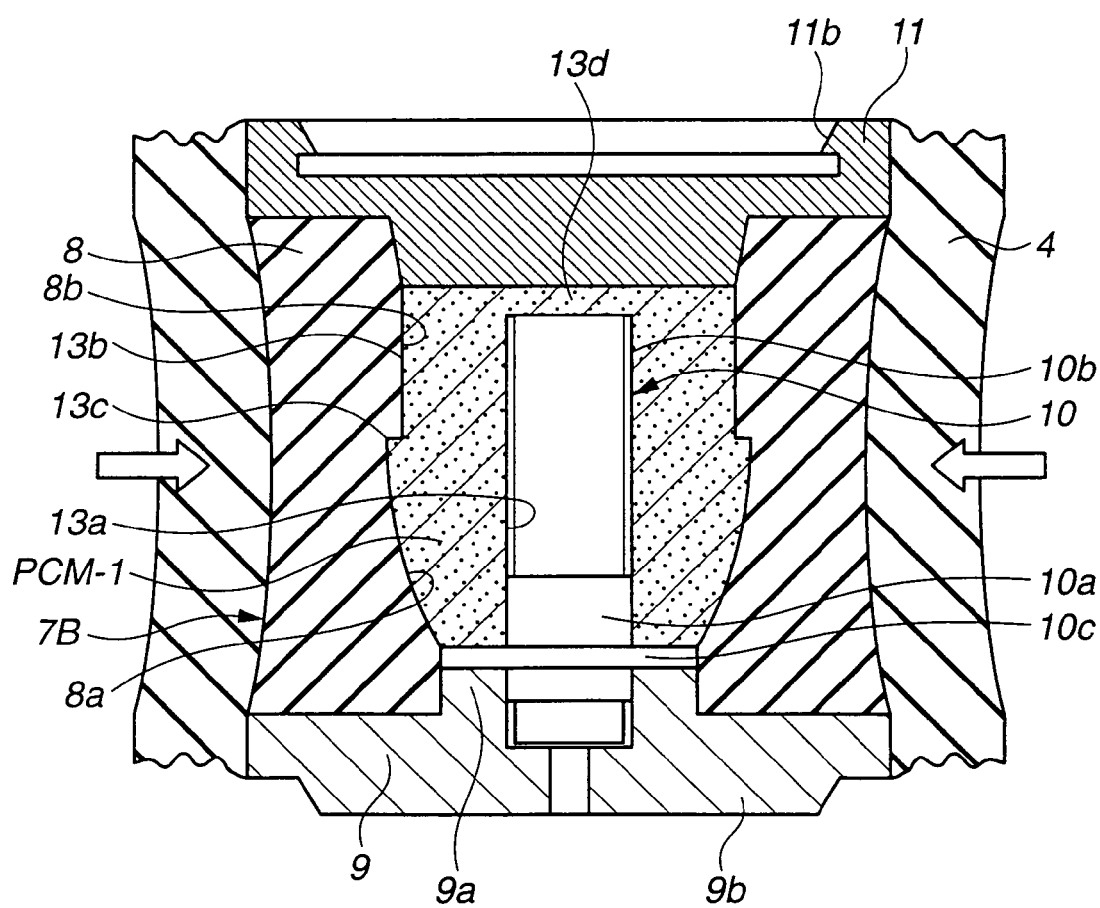
FIG. 4 is a view similar to FIG. 3, but showing a condition wherein the flexible mold is compressed by a flexible tube of the female die during a molding precess.

Thus, as is seen from FIG. 4, the powdered ceramic material "PCM-0" in each flexible mold 7A, 7B or 7C is compressed to produce a molded cylindrical green body "PCM-1" for the insert which is finally produced. As shown, the molded green body "PCM-1" thus produced is shaped like a bell corresponding to the shape of the cavity 8a defined by the hollow member 8.

It is to be noted that upon this molding, due to presence of the cylindrical core 10, a cylindrical bore is produced in the molded green body "PCM-1" thus produced, that is a female thread bore portion (or internally threaded cylindrical portion) 13a intimately engaging with the male thread portion 10b of the cylindrical core 10. The female thread bore portion 13a has one end closed by an end wall portion 13d of the green body "PCM-1". Furthermore, due to presence of the two projections 8b on the diametrically opposed portions of the hollow member 8, respective recesses 13b are formed on diametrically opposed portions of the cylindrical outer surface of the molded green body "PCM-1". Denoted by numeral 13c is the most-enlarged annular part concentrically formed on the cylindrical surface of the green body "PCM-1".

Then, as will be understood from FIG. 1, the predetermined hydrostatic pressure is removed from the metal tube 1 and the upper and lower lids 2 and 3 of the female die "A" are removed. Upon this, as is seen from FIG. 5, each of the three flexible molds 7A, 7B and 7C of the male die "B" is released from such pressure and thus the rubber hollow member 8 expands radially outward by its own force.

Under this condition, the following inequality is established.

$$W > Do \quad (1)$$

wherein:
W: Diameter of the cylindrical cavity 8a of the hollow member 8 where the projections 8b are formed.
Do: Diameter of the most-enlarged annular part 13c of the molded green body "PCM-1".

Then, as will be understood from FIG. 1, the male die "B" is removed from the female die "A", and the three flexible molds 7A, 7B and 7C are detached from the cylindrical base 6 and from one another.

Figure 6:
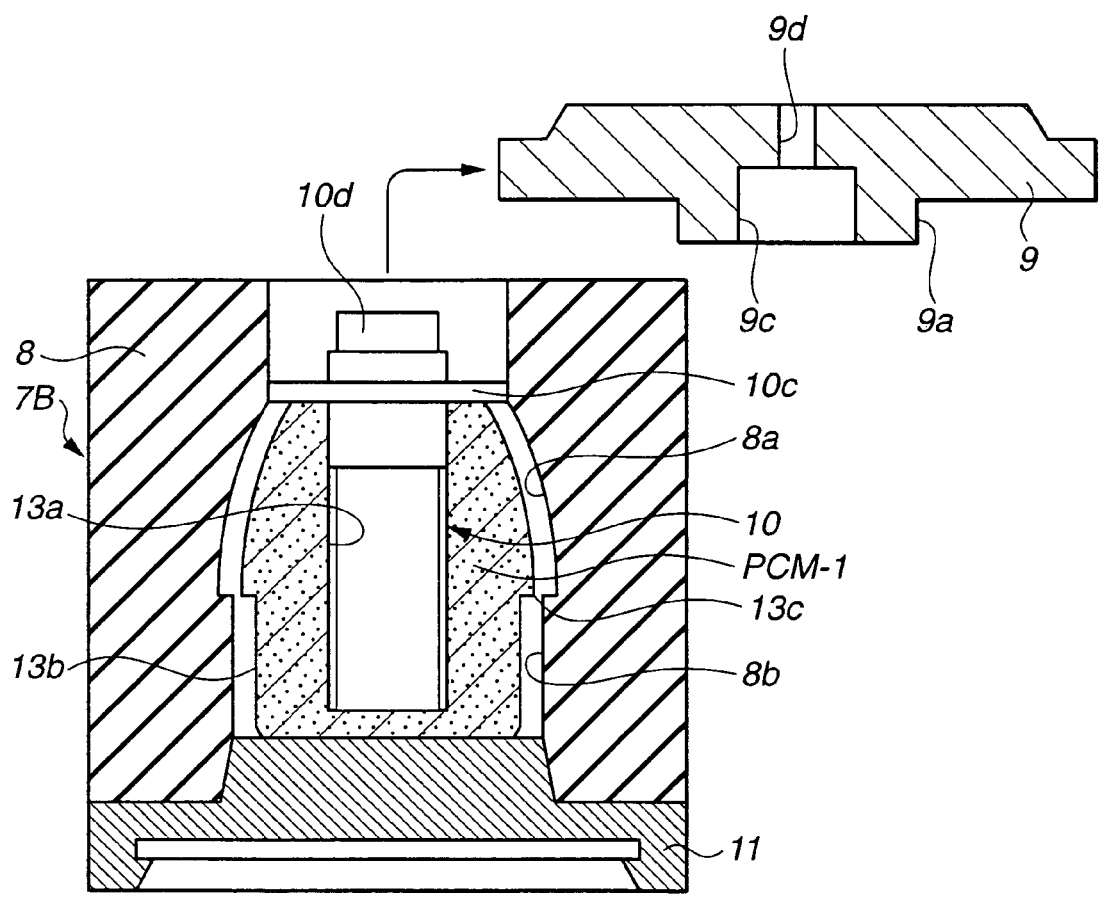
FIG. 6 is a view similar to FIG. 3, but showing a condition wherein the flexible mold is set upside down and a lower lid of the flexible mold is just removed.

Then, as is seen from FIG. 6, each flexible mold 7A, 7B or 7C is turned upside down and put on a suitable table. Then, the lower lid 9 is removed.

Figure 7:
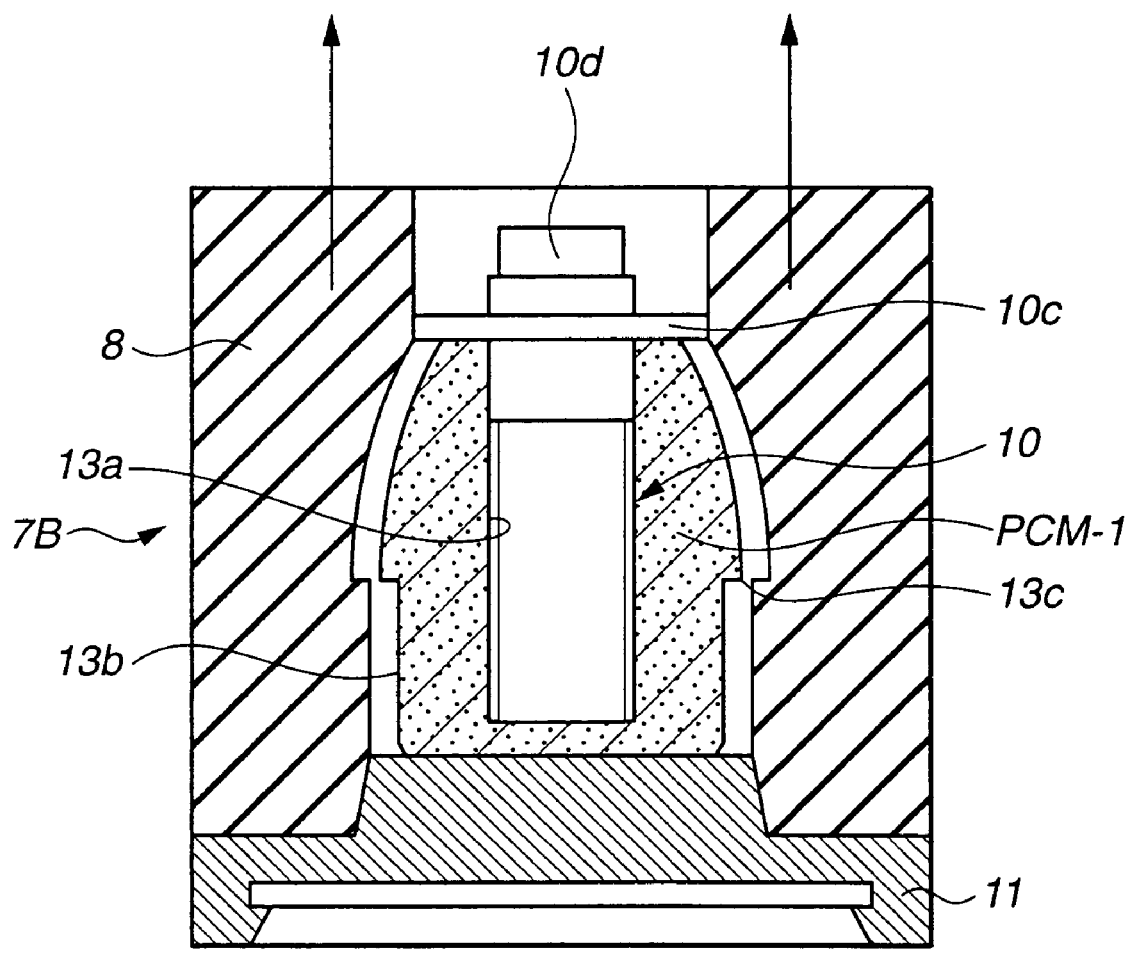
FIG. 7 is a view similar to FIG. 6, but showing a condition wherein a flexible hollow member of the flexile mold is about to be removed from a molded green body produced.

Then, as is seen from FIG. 7, the rubber hollow member 8 is removed from the molded green body "PCM-1" as is indicated by the arrows in the drawing. Because of the above-mentioned inequality, that is, "W > Do", such removal is easily carried out.

Figure 8:
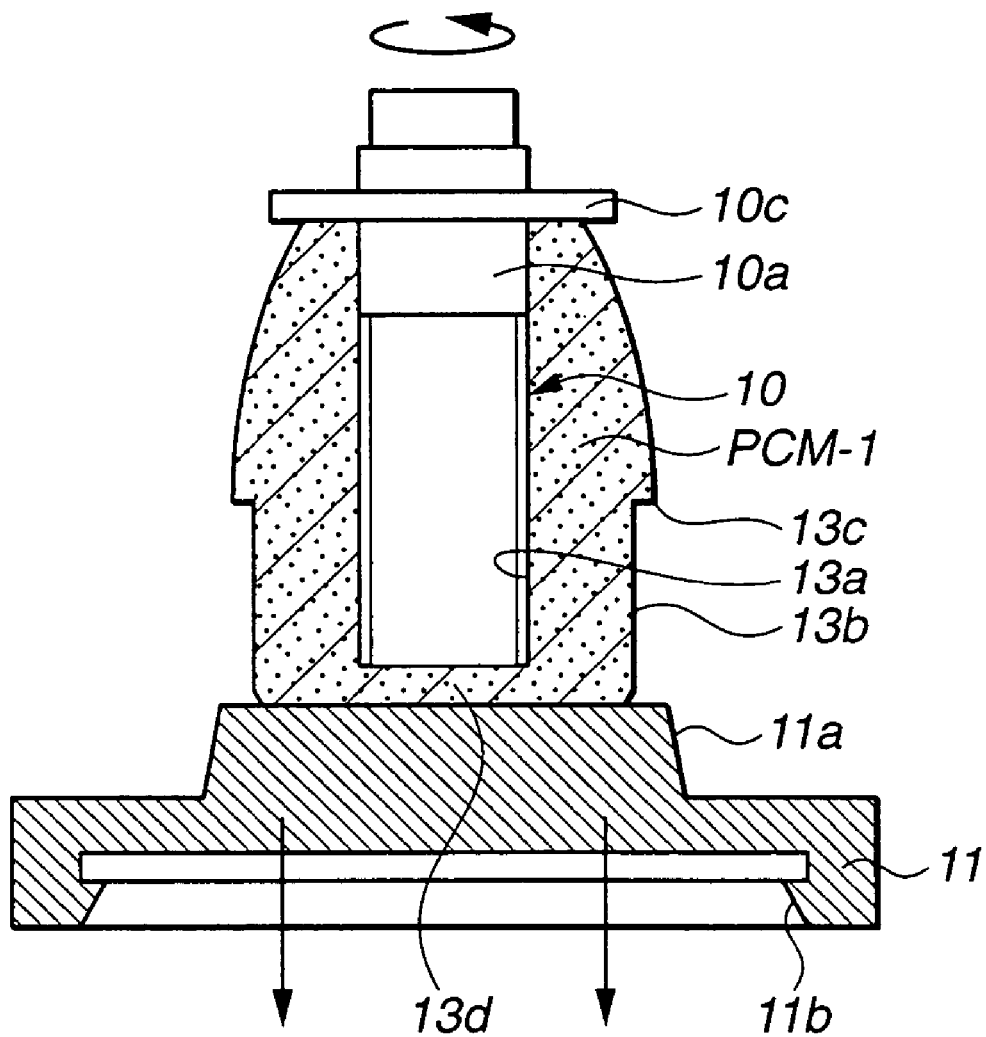
FIG. 8 is a view similar to FIG. 7, but showing a condition wherein the cylindrical core and an upper lid are about to be removed from the molded green body.

Then, as is seen from FIG. 8, the cylindrical core 10 is turned in a releasing direction as is indicated by the turning arrow and removed from the molded green body "PCM-1", and then the upper lid 11 is removed from the green body "PCM-1" as is indicated by the arrows in the drawing. With these steps, the cylindrical molded green body "PCM-1" becomes naked.

It is now to be noted that the green body "PCM-1" thus naked is shaped like the bell, and has the female thread bore portion 13a, the diametrically opposed two recesses 13b on the cylindrical outer surface of the body "PCM-1", the most-enlarged annular part 13c and the end wall portion 13d, as shown.

In the above, it is described that a hydrostatic pressure of about 500 Kg/cm² is applied to the metal tube 1 for producing the molded green body "PCM-1". However, experiments by the inventors have revealed that a hydrostatic pressure of about 300 to 1000 Kg/cm² is sufficient for producing such body "PCM-1". If the pressure is lower than 300 Kg/cm² is the green body "PCM-1"produced fails to have a sufficient strength which causes production of cracks of the body during the baking. While, if the pressure is higher than 1000 Kg/cm², it takes a long time to carry out the pressure releasing, which deteriorates the productivity of the green body "PCM-1".

The cylindrical molded green body "PCM-1" produced in the above-mentioned manner is then subjected to "sintering or baking process".

That is, the naked green body "PCM-1" is put into a gas furnace and burnt at a temperature of about 1600° C. for about 2 hours, and then cooled at a cooling speed of about 100° C./h.

Figure 9A:
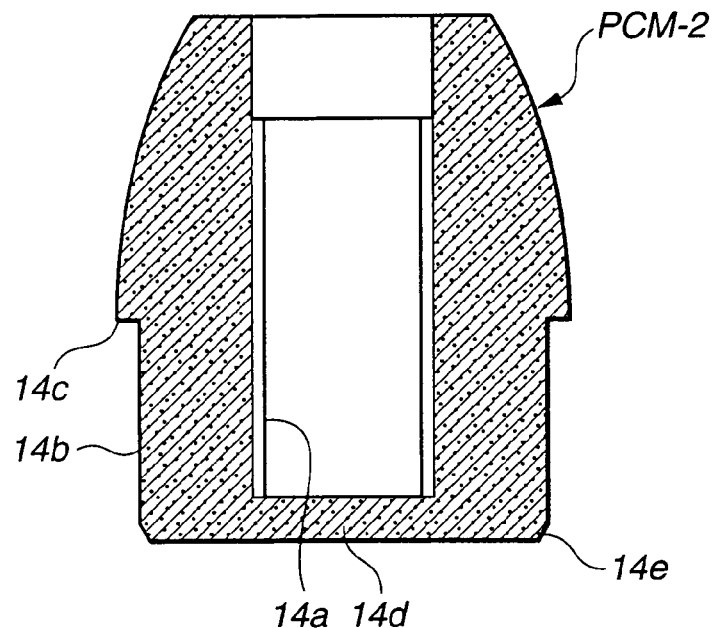
FIGS. 9A and 9B are views of an insert produced by sintering or baking the molded green body, FIG. 9A being a vertically sectional view of the produced insert and FIG. 9B being a front view of the same.

With this baking step, as is seen from FIG. 9A, a final product, that is, an insert "PCM-2" is produced. That is, the insert "PCM-2" thus finally produced is shaped like a bell, and has a female thread bore portion 14a, two diametrically opposed recesses 14b on the cylindrical outer surface of the finally produced insert "PCM-2", a most-enlarged annular part 14c and an end wall portion 14d, which are baked products of the above-mentioned female thread bore portion 13a, the diametrically opposed two recesses 13b, the most-enlarged annular part 13c and the end wall portion 13d of the cylindrical molded green body "PCM-1". Denoted by numeral 14e is a chamfered portion provided by the end wall portion 14d.

Figure 9B:
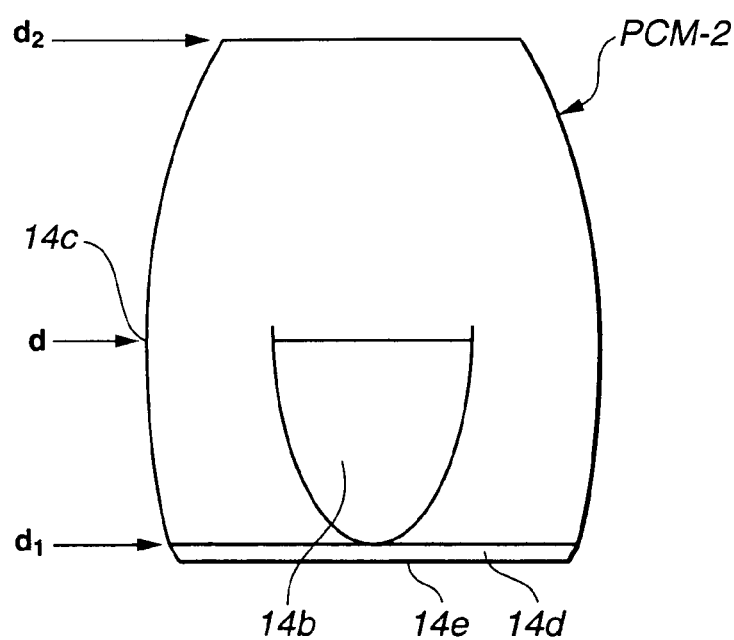

As is seen from FIG. 9B that shows a front view of the finally produced insert "PCM-2", the following inequality is established in the finally produced insert "PCM-2".

$$d > d1 > d2 \quad (2)$$

wherein:
d: Diameter at the most-enlarged annular part 14c.
d1: Diameter at the end wall portion 14d.
d2: Diameter of the open side of the insert.

This dimensional inequality (2) is also established in the molded green body "PCM-1".

In the following, method of embedding the finally produced insert "PCM-2" into a concrete structure 19 will be described with reference to FIGS. 10 and 11.

Figure 10:
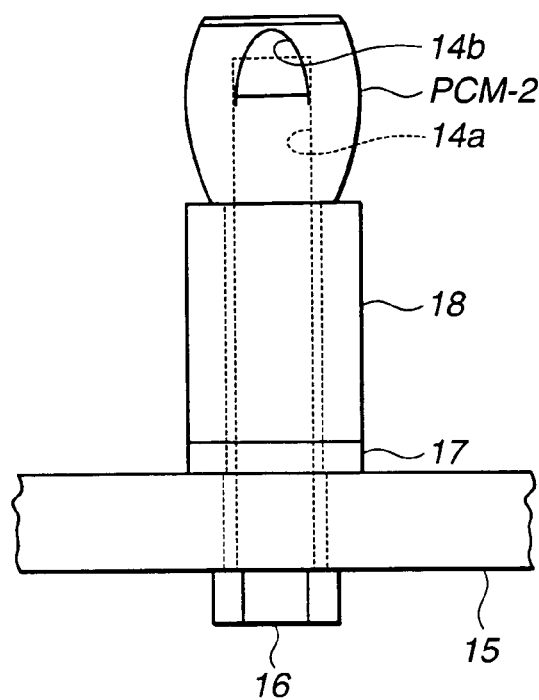
FIG. 10 is a front view of the insert in a condition wherein the insert is connected to a formwork through a connecting bolt, a holding tube and a rubber packing.

First, as is seen from FIG. 10, the finally produced insert "PCM-2", a holding tube 18 and a rubber packing 17 are aligned on an apertured part of a formwork 15, and then, a connecting bolt 16 is passed through these aligned members and turned about its axis in a connecting direction causing an externally threaded leading end of the connecting bolt 16 to engage with the female thread bore portion 14a of the finally produced insert "PCM-2". With this, the insert "PCM-2", the holding tube 18 and the rubber packing 17 are all connected to the formwork as a fixed unit.

Figure 11:
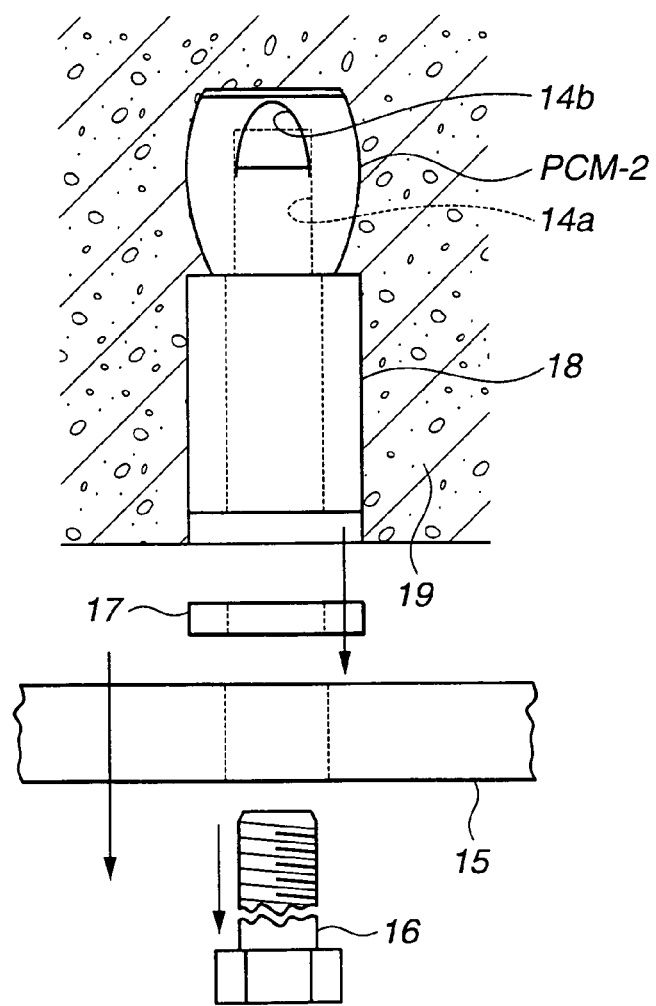
FIG. 11 is a view showing that the insert and the holding tube are left in a cured concrete structure.

Then, a non-cured concrete is poured into the formwork to embed therein the fixed unit as is seen from FIG. 11.

Then, as is seen from the same drawing, after the concrete is cured to have a sufficient hardness, the connecting bolt 16 is turned in a disconnecting directing and removed from the insert "PCM-2" together with the rubber packing 17 and the formwork 15. With these steps, the insert "PCM-2" and the holding tube 18 are left and embedded in the cured concrete structure 19 as an insert unit with the female thread bore portion 14a kept exposed to the outside through the holding tube 18.

Accordingly, any construction parts can be easily and tightly connected to the cured concrete structure 19 by engaging a connecting bolt (not shown) that has an externally threaded leading end identical with that of the connecting bolt 16.

As is described hereinabove, according to the present invention, there are provided a first method of producing a molded green mold "PCM-1" from a powdered ceramic material "PCM-0" and a second method of producing an insert "PCM-2"from the molded green mold "PCM-1".

In the following, unique features of the present invention will be described.

First, the cylindrical core 10 is equipped with the annular flange 10c. Thus, as is seen from FIG. 4, under molding operation, the annular flange 10c is pressed against the upper end of the circular projection 9a of the lower lid 9 thereby to stably hold the core 10 relative to the flexible mold 7B. This means that the female thread bore portion 14a (see FIG. 9A) produced by the core 10 can have an exact positioning relative to the body of the finally produced insert "PCM-2". In other words, the female thread bore portion 14a can show a perpendicular positioning relative to the open end surface of the insert "PCM-2". This feature suppresses or at least minimizes an undesirable matter wherein a connecting bolt for connecting construction parts to the concrete structure 19 fails to correctly engage with the female thread bore portion 14a of the insert "PCM-2". Furthermore, due to provision of the annular flange 10c of the core 10 (see FIG. 4), the lower lid 9 of the flexible mold 7B (or 7A or 7C) is prevented from directly contacting the molded green body "PCM-1" during the molding process. This is advantageous because a possibility of breaking the open side of the molded green body "PCM-1"during the removal of the core 10 from the green body "PCM-1" is quite lowered. Actually, in the present invention, removal of the core 10 from the green body "PCM-1" is smoothly carried out by turning the core 10.

Second, each of the three flexible molds 7A, 7B and 7C comprises the lower lid 9 with the tapered projection 9b that is to be received in the tapered recess 11b of the upper lid 11 of a different flexible mold and the upper lid 11 with the tapered recess 11b that is to receive the tapered projection 9b of the lower lid 9 of a different flexible mold. Accordingly, as is seen from FIG. 1, the three flexible molds 7A, 7B and 7C can be stably piled on one another and stably put on the base 6 when forming the male die "B". This stable arrangement promotes the even application of the pressure to the powdered ceramic material "PCM-0" contained in the flexible molds 7A, 7B and 7C, and thus increases the mechanical strength of the molded green body "PCM-1".

Third, as is understood from FIGS. 9A and 9B, the finally produced insert "PCM-2" is bell-shaped with a smoothly curved outer surface. Such shape exhibits a marked resistance against a breakage when it falls to a hard surface, such as a surface of the cured concrete structure. Furthermore, due to the shape with the smoothly curved surface, the insert "PCM-2" can be snugly held in the non-cured concrete.

Fourth, as is understood from FIGS. 9A and 9B, the two diametrically opposed recesses 14b of the insert "PCM-2" are positioned in the vicinity of the end wall portion 14d that is away from the open end part of the female thread bore portion 14a. Such positioning of the recesses 14b does not affect the durability of the open end of the female thread bore portion 14a that is highly stressed when a constructional part is connected to the insert "PCM-2" by a connecting bolt. If the two diametrically opposed recesses 14b are positioned near the open end part of the female thread bore portion 14a, the durability of the open end part is reduced.

Figure 5:
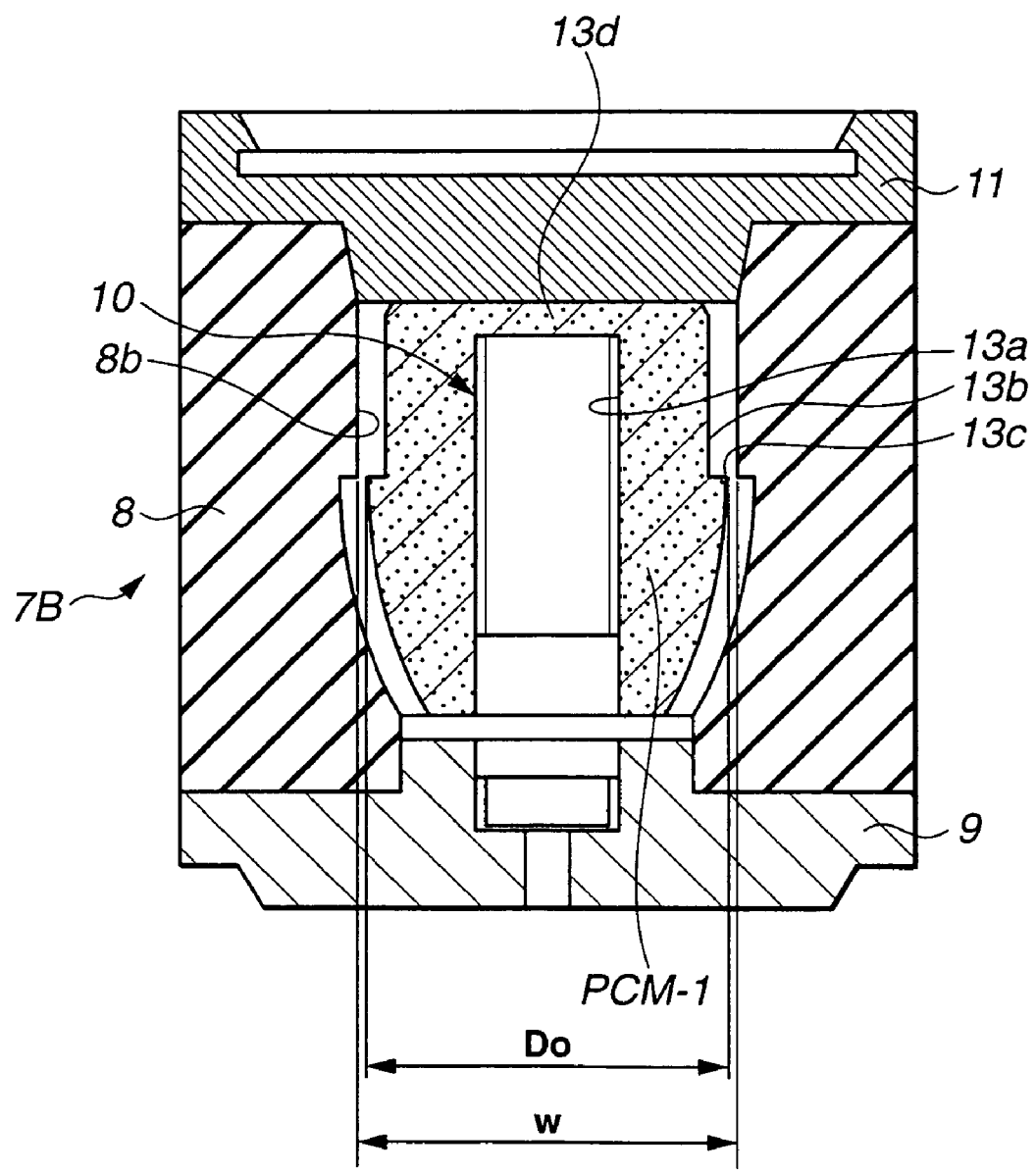
FIG. 5 is a view similar to FIG. 3, but showing a condition wherein the pressure applied to the flexible mold is released.

Fifth, as is seen from FIGS. 5 and 7, because of adoption of the inequality "W>Do ", removal of the hollow member 8 from the molded green body "PCM-1", or removal of the molded green body "PCM-1" from the hollow member 8 is easily carried out.

The entire contents of Japanese Patent Application 2003-194084 (filed Jul. 9, 2003) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A method of producing a molded green body of an insert which is used as an insert element embedded in a concrete structure and has recesses on its outer surface, the method comprising:

(a) preparing a flexible mold which includes a flexible hollow member and upper and lower lids which can close upper and lower open ends of the flexible hollow member to form in the flexible hollow member a molding cavity, the flexible hollow member having projections that are exposed to the molding cavity;

(b) setting a cylindrical core to the lower lid while making an assured positioning of the cylindrical core relative to the lower lid by intimately putting a flat surface of the cylindrical core on a flat surface of the lower lid, and setting the lower lid to the lower open end of the flexible hollow member in such a manner that a major portion of the core is projected into the molding cavity, the major portion of the core being formed on its cylindrical outer surface with a male thread portion and having a closed top end;

(c) pouring a powdered ceramic material into the molding cavity from the upper open end of the flexible hollow member to fill the molding cavity with the powdered ceramic material, and setting the upper lid to the upper open end of the flexible hollow member in such a manner that a space defined between the upper lid and the closed top end of the cylindrical core is filled with the powdered ceramic material;

wherein the flexible mold is nut in a flexible tube of a female die after the pouring step, and then the flexible tube is compressed by a hydrostatic pressure to compress the flexible hollow member in the flexible tube thereby to compress the powdered ceramic material in the molding cavity of the flexible mold;

(d) compressing the flexible hollow member from the outside to compress the powdered ceramic material thereby to produce in the molding cavity a molded green body that holds therein the cylindrical core;

(e) removing the molded green body together with the cylindrical core from the flexible mold once the molding of the molded green body is sufficiently carried out; and (f) turning the cylindrical core in a releasing direction relative to the molded green body thereby to remove the cylindrical core from the molded green body;

wherein the cylindrical core is provided with an annular flange having the flat surface which is, upon completion of the step (b), intimately put on the flat surface of the lower lid, the annular flange having a periphery that is in contact with an inner wall of the flexible hollow member and having a diameter that is larger than that of an open side axial end of the molded green body, and wherein the lower lid and the cylindrical core are produced separately.

2. A method as claimed in claim 1, in which before the step (d), the flexible mold is combined with another flexible mold that has been filled with the same powdered ceramic material, and then the combined flexible molds are subjected to the step (d).

3. A method as claimed in claim 2, in which, for achieving the step (d), the combined flexible molds are put on a base member to constitute a male die, then the male die is inserted into a flexible tube of a female die and then the flexible tube is compressed by a hydrostatic pressure to compress the flexible hollow members of the combined flexible molds thereby to compress the powdered ceramic material in the combined flexible molds at the same time.

4. A method as claimed in claim 1, in which an inner diameter of the flexible hollow member under a free condition at a portion where the projections are provided is larger than a diameter of a most-enlarged annular part of the molded green body.

5. A method as claimed in claim 1, in which the flexible hollow member is so shaped as to produce a molded green body which has a generally cylindrical outer shape and a largest diameter at a generally middle portion of the molded green body.

6. A method as claimed in claim 1, in which the flexible hollow member is so shaped as to produce a molded green body which has a bell shape and a largest diameter at a generally middle portion of the molded green body.

7. A method as claimed in claim 1, in which the flexible hollow member is so shaped as to produce a molded green body which is narrower at one end, and slightly curves towards a largest diameter at a generally middle portion of the molded green body.

8. A method of producing an insert which is used as an insert element embedded in a concrete structure and has recesses on its outer surface, the method comprising:

(a) preparing a flexible mold which includes a flexible hollow member and upper and lower lids which can close upper and lower open ends of the flexible hollow member to form in the flexible hollow member a molding cavity, the flexible hollow member having projections that are exposed to the molding cavity;

(b) setting a cylindrical core to the lower lid while making an assured positioning of the cylindrical core relative to the lower lid by intimately putting a flat surface of the cylindrical core on a flat surface of the lower lid, and setting the lower lid to the lower open end of the flexible hollow member in such a manner that a major portion of the core is projected into the molding cavity, the major portion of the core being formed on its cylindrical outer surface with a male thread portion and having a closed top end;

(c) pouring a powdered ceramic material into the molding cavity from the upper open end of the flexible hollow member to fill the molding cavity with the powdered ceramic material, and setting the upper lid to the upper open end of the flexible hollow member in such a manner that a space defined between the upper lid and the closed top end of the cylindrical core is filled with the powdered ceramic material;

wherein the flexible mold is put in a flexible tube of a female die after the pouring step, and then the flexible tube is compressed by a hydrostatic pressure to compress the flexible hollow member in the flexible tube thereby to compress the powdered ceramic material in the molding cavity of the flexible mold;

(d) compressing the flexible hollow member from the outside to compress the powdered ceramic material thereby to produce in the molding cavity a molded green body that holds therein the cylindrical core;

(e) removing the molded green body together with the cylindrical core from the flexible mold once the molding of the molded green body is sufficiently carried out;

(f) turning the cylindrical core in a releasing direction relative to the molded green body thereby to remove the cylindrical core from the molded green body; and (g) baking the molded green body to produce the insert;

wherein the cylindrical core is provided with an annular flange having the flat surface which is, upon completion of the (b), intimately put on the flat surface of the lower lid, the annular flange having a periphery that is in contact with an inner wall of the flexible hollow member and having a diameter that is larger than that of an open side axial end of the molded green body, and wherein the lower lid and the cylindrical core are produced separately.

9. A method as claimed in claim 8, in which before the step (d), the flexible mold is combined with another flexible mold that has been filled with the same powdered ceramic material, and then the combined flexible modes are subjected to the step (d).

10. A method as claimed in claim 9, in which, for achieving the step (d), the combined flexible molds are put on a base member to constitute a male die, then the male die is inserted into a flexible tube of a female die and then the flexible tube is compressed by a hydrostatic pressure to compress the flexible hollow members of the combined flexible molds thereby to compress the powdered ceramic material in the combined flexible molds at the same time.

* * * * *